(12) United States Patent
Datta et al.

(10) Patent No.: US 6,594,756 B1
(45) Date of Patent: Jul. 15, 2003

(54) MULTI-PROCESSOR SYSTEM FOR SELECTING A PROCESSOR WHICH HAS SUCCESSFULLY WRITTEN IT'S ID INTO WRITE-ONCE REGISTER AFTER SYSTEM RESET AS THE BOOT-STRAP PROCESSOR

(75) Inventors: Sham Datta, Hillsboro, OR (US); Mani Ayyar, Cupertino, CA (US); Douglas Moran, Beaverton, OR (US); Stephen S. Pawlowski, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/392,227

(22) Filed: Sep. 8, 1999

(51) Int. Cl.[7] .............................................. G06F 9/445
(52) U.S. Cl. .............................................. 713/2; 713/1
(58) Field of Search ........................................ 713/1, 2

(56) References Cited

U.S. PATENT DOCUMENTS 5,669,002 A * 9/1997 Buch ........................... 395/726
5,673,388 A * 9/1997 Murthi et al. ............. 395/183.18
5,724,527 A * 3/1998 Karnik et al. ................ 395/308
6,108,781 A * 8/2000 Jayakumar ...................... 713/2

* cited by examiner

Primary Examiner—Thomas Lee
Assistant Examiner—Nitin C. Patel
(74) Attorney, Agent, or Firm—Blakely, Sokoloff, Taylor & Zafman LLP (57) ABSTRACT

A bootstrap processor selection mechanism for a computer system employs system logic having a memory-mapped sticky, e.g. write-once, register, multiple processors, and a firmware routine through which the processors may store values to and load values from the sticky register. When a reset event is detected, the processors vie for access to the sticky register, using the firmware routine. The first processor that successfully stores its associated processor ID to the sticky register, locks the register against subsequent store operations by the remaining processors. Each processor loads the value stored in the sticky register and compares it with its processor ID to determine whether it is the bootstrap processor.

22 Claims, 5 Drawing Sheets

MULTI-PROCESSOR SYSTEM FOR SELECTING A PROCESSOR WHICH HAS SUCCESSFULLY WRITTEN IT'S ID INTO WRITE-ONCE REGISTER AFTER SYSTEM RESET AS THE BOOT-STRAP PROCESSOR

BACKGROUND OF THE INVENTION

1. Technical Field

The present invention relates to mechanisms for bootstrapping computer systems, and in particular, to methods for bootstrapping multi-processor computer systems using hardware assistance.

2. Background Art

Bootstrapping is the process by which a computer is brought to its operating state from a powered-off state or following a reset event. The bootstrapping process typically begins with the processor(s) of the computer system and proceeds outward to system level resources. For many computer systems, bootstrapping begins with each processor in the system executing a built-in-self-test (BIST) that is stored on the processor chip in the form of micro-code. A processor executes this micro-code to test its internal components and to initialize certain processor registers. For example, the processor may read certain pins when a reset condition is detected, to determine its assigned identification number ("processor ID"). The micro-code store also provides a scratch pad that allows the processor to perform limited data manipulations.

Following the initial self-test portion of the bootstrap process, non-processor components of the computer system, such as memory, system logic, and peripheral devices, are tested and initialized. System-level initialization procedures include checking the integrity of memory, identifying and initializing non-processor components in the computer system, and loading the operating system into memory. For uni-processor systems, the single processor handles system-level initialization.

For multi-processor (MP) systems, a monarch or boot-strap processor (BSP) is selected from among the multiple processors to handle system-level initialization. In MP systems, initialization includes coordinating the other, non-BSP processors in addition to the procedures described above. For example, the BSP may signal the other processors to test their memory interfaces when the system memory is brought on line. One BSP-selection algorithm employs a message passing protocol to identify the processor having the highest numbered processor ID and to designate this processor as the BSP. This algorithm is described in U.S. Pat. No. 5,904,733, *Bootstrap Processor Selection Architecture In Symmetric Multiprocessor Systems*.

BSP-selection algorithms may be stored as micro-code in each processor of the MP system, but this approach consumes additional processor die area and is less versatile. To reduce the impact on processor die area, some MP systems store the BSP selection algorithm as a firmware routine in a shared, non-volatile memory device. The use of off-chip storage also allows original equipment manufacturers (OEMs) to add their own BSP selection routines to a processor. The firmware implementation of the BSP selection algorithm is usually stored in a "hardware-protected" region of non-volatile memory. Hardware-protected firmware can not be altered without special equipment. It is used to preserve the core portions of the bootstrapping algorithm against events that could otherwise disable the computer system entirely.

Unlike micro-code, non-volatile memories do not provide a scratch pad for data manipulation. Firmware-based algorithms can still perform data manipulations, but the lack of a scratch pad makes these algorithms more complex to implement and debug. For example, the firmware implementation of the message-passing BSP-selection algorithm employs more instructions than the micro-code implementation, and a relatively large hardware-protected region of firmware is necessary to accommodate it. Since hardware-protected firmware can not be updated in the field, increasing the size of this region reduces the amount of updateable non-volatile memory available to the computer system. In addition, the relative complexity of firmware-implemented, BSP-selection routines makes them difficult to debug and port to different hardware platforms.

The present invention addresses these and other issues associated with BSP selection.

SUMMARY OF THE INVENTION

The present invention supports bootstrap processor selection in a multi-processor computer system, using a relatively compact firmware routine in combination with system logic.

A computer system in accordance with the present invention includes system logic having a sticky, e.g. write-once, register, multiple processors, and a firmware routine through which the processors may read and write the sticky register. When a reset event is detected, the processors vie for access to the sticky register, and the first processor that successfully writes its associated processor ID to the sticky register becomes the bootstrap processor.

For one embodiment of the invention, the sticky register is memory-mapped and the firmware routine includes a store instruction and a load instruction that target the memory-mapped address of the sticky register. The processor writes (stores) its processor ID to the sticky register, reads (loads) a value from the sticky register, and compares the read value to its processor ID. If the processor is the first to successfully write the sticky register, the read value matches the processor's ID, and the processor proceeds with the bootstrap routine. Writes executed by subsequent processors to update the register are not recorded in the sticky register.

BRIEF DESCRIPTION OF THE DRAWINGS

The present invention may be understood with reference to the following drawings, in which like elements are indicated by like numbers. These drawings are provided to illustrate selected embodiments of the present invention and are not intended to limit the scope of the invention.

DETAILED DESCRIPTION OF THE INVENTION

The following discussion sets forth numerous specific details to provide a thorough understanding of the invention.

However, those of ordinary skill in the art, having the benefit of this disclosure, will appreciate that the invention may be practiced without these specific details. In addition, various well-known methods, procedures, components, and circuits have not been described in detail in order to focus attention on the features of the present invention.

Figure 1:
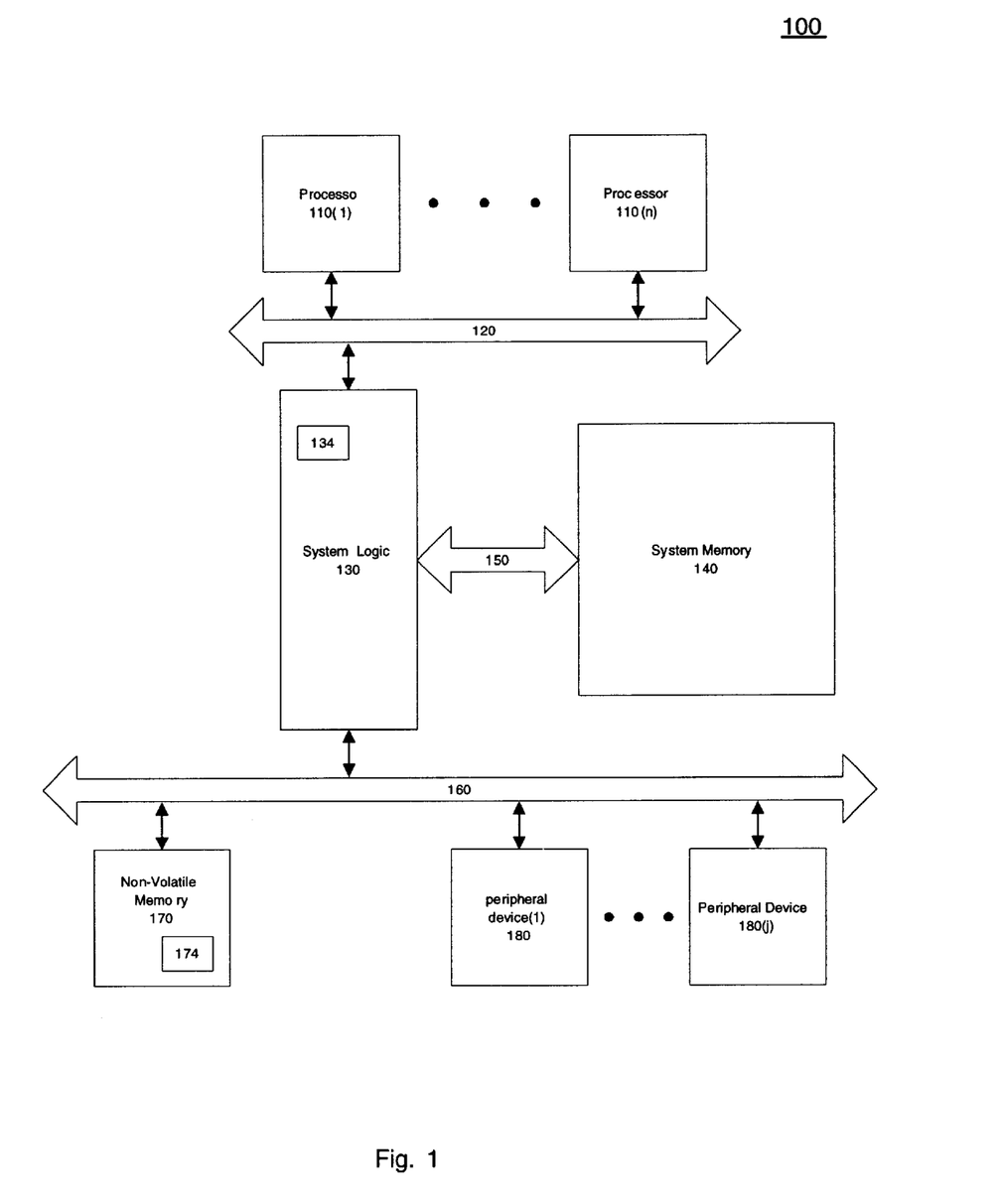
FIG. 1 is a block diagram of one embodiment of a multi-processor system in which the present invention may be implemented.

FIG. 1 is a block diagram of one embodiment of a computer system 100 that implements the present invention. The disclosed embodiment of computer system 100 includes one or more processors 110(1)–110(n) (collectively, processors 110) that are coupled to system logic 130 through a processor bus 120. A system memory 140 is coupled to system logic 130 through bus 150, and a non-volatile memory 170 is coupled to system logic 130 through a bus 160. Also shown are one or more peripheral devices 180(1)–180(j) (collectively, devices 180) that are coupled to system logic 130 through bus 160. Bus 160 may be, for example, one or more peripheral component interconnect (PCI) buses. Non-volatile memory 170 may be a static memory device such as a read only memory (ROM) or flash memory. Peripheral devices 180 include, for example, a keyboard, a mouse or other pointing device, mass storage devices such as hard drives and digital video discs (DVD), a display, and the like. These devices, together with system logic 130 and non-volatile memory 170 represent the system-level resources of computer system 100.

The disclosed configuration of computer system 100 is provided only to illustrate the present invention. Embodiments of the present invention may be implemented in a variety of configurations. Alternative configurations need only provide the processors with access to non-volatile memory and a sticky register that can be read/written through firmware stored in the non-volatile memory.

The present invention supports bootstrap processor selection through system logic 130 and a hardware-protected block of firmware ("bootblock") 174 in non-volatile memory 170. Hardware-protected firmware refers to firmware that is loaded under circumstances that make it difficult to subsequently alter the code. For example, hardware-protected firmware may only be write-able when a specified voltage level is driven on a selected pin of the associated non-volatile memory device. This prevents the protected firmware from being corrupted during operation of the computer system. However, this also makes it difficult to alter or update the firmware subsequently. For this reason, the size of the hardware protected firmware is kept as small as possible.

For one embodiment of the present invention, each processor 110 implements a first segment of bootblock 174 on reset to test and initialize its local resources, e.g. a BIST. Processors 110 then vie for access to a write-once ("sticky") register 134 in system logic 130 through a second firmware segment of bootblock 174. The second firmware segment is used to write a value to and read a value from sticky register 134. Because it is a write-once register, sticky register 134 records only the first value written to it following reset. Subsequent writes to sticky register 134, e.g. writes by other than the first processor, are not recorded, until another reset event occurs. In accordance with the present invention, the first processor to successfully access sticky register 134 serves as the BSP. The BSP initiates bootstrapping of system level resources, such as memory 140 and peripheral devices 180. The remaining (non-BSP) processors enter a firmware loop until they are released by the BSP.

For one embodiment of the invention, each processor 110 determines an associated processor identifier (ID). Since this is a local, i.e. processor-specific, property it may be determined using the first segment of bootblock 174 or the processor's hardware. Operations involving system level resources, such as sticky register 134, are handled through the second segment of bootblock 174. Portions of this segment of bootblock 174 may be single-threaded, to limit access to one processor at a time. By assigning a memory-mapped address to sticky register 134, register accesses may be implemented using relatively simple load and store instructions. The load and store instructions are easily accommodated in the limited storage space available for bootblock 174. The first of processors 110 that writes its associated processor ID to sticky register 134 and reads it back, using the commands in bootblock 174, operates as the BSP.

The present invention is described for the case in which the processors execute a firmware implementation of the BIST, but it is not restricted to firmware implementations of these functions. Some or all of the BIST functions may be implemented in micro-code, with a corresponding trade-off in on-die storage required.

Figure 2:
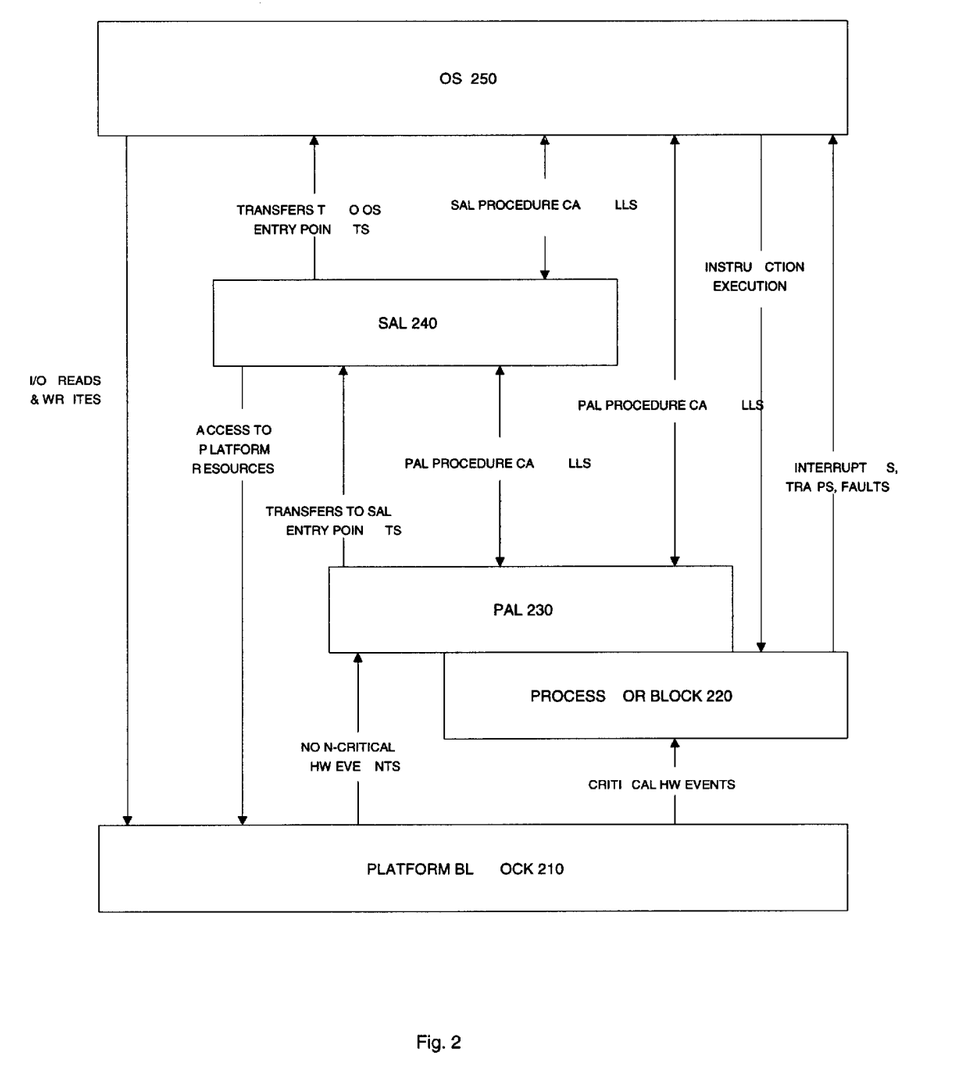
FIG. 2 represents one embodiment of a software stack that includes firmware layers suitable for implementing the present invention.

FIG. 2 represents one embodiment of a software stack 200 that may run on computer system 100. Software stack 200 includes firmware modules for implementing the present invention. The disclosed embodiment of software stack 200 is suitable for a computer system based on the IA64 Architecture of Intel Corporation, Santa Clara, Calif. The IA64 Architecture is described, for example, in the *IA-64 Application Instruction Set Architecture Guide*, Rev. 1.0, published by Intel Corporation in April, 1999. In the figure, platform block 210 represents the non-processor hardware of computer system 100, including peripheral devices 180 such as keyboards, mice, and mass storage devices, system logic 130, and memory 140. Processor block 220 represents the processor hardware, e.g. processors 110 of computer system 100.

The firmware components of the disclosed embodiment of software stack 200 include a processor abstraction layer (PAL) 230 and a system abstraction layer 240. PAL 230 and SAL 240 are stored in non-volatile memory 170 so they are available for bootstrapping. Portions of PAL 230 and SAL 240 may be copied to main memory 140 as part of the bootstrap process. An operating system (OS) 250 and higher level application software (not shown) are typically stored on a hard disk or other mass storage device, i.e. one of peripheral devices 180, and loaded into main memory 140 during system boot.

PAL 230 represents a block of firmware routines that may be implemented by each processor in computer system 100 to provide a standard set of processor-level features and/or functions to higher level firmware/software, e.g. SAL 240, OS 250 and application software (not shown). Features/functions that are not implemented directly in the processor hardware may be emulated through PAL routines to hide the implementation details of processors 110 from the higher level firmware/software. Various routines in PAL 230 may be executed concurrently by multiple processors 110 ("multi-threaded routines"). Other routines may be executed by only one processor at a time ("single threaded routines").

Above PAL 230 in software stack 200 is SAL 240, which encapsulates many features/functions of platform block 210. Firmware routines in SAL 240 may be implemented by processors 110, alone or in combination, to provide a standard set of system features and/or functions to OS 250 and application software. Portions of SAL 240 may be single threaded to prevent multiple processors from concurrently accessing certain system resources. Other portions of SAL 240 may be multi-threaded.

As indicated in FIG. 2, OS 250 may communicate directly with resources in processor block 220 (processors 110) and platform block 210. OS 250 may also communicate with these hardware resources indirectly. For example, OS 250 may operate through procedure calls to PAL 230 and SAL 240. In addition, PAL 230 and SAL 240 may communicate through procedure calls. As discussed in greater detail below, processors may access routines in PAL 230 directly through various entry points. Routines in SAL 240 are typically accessed through PAL 230. For example, on reset each processor may access a self-test routine in PAL 230, which eventually calls a procedure in SAL 240 to select a BSP.

Resources in processor block 220 and platform block 210 may communicate directly to handle performance critical hardware events such as interrupts. Persons skilled in the art will recognize that references to actions by PAL 230, SAL 240, and OS 250 refer to actions implemented by processors executing routines in these entities.

Figure 3:
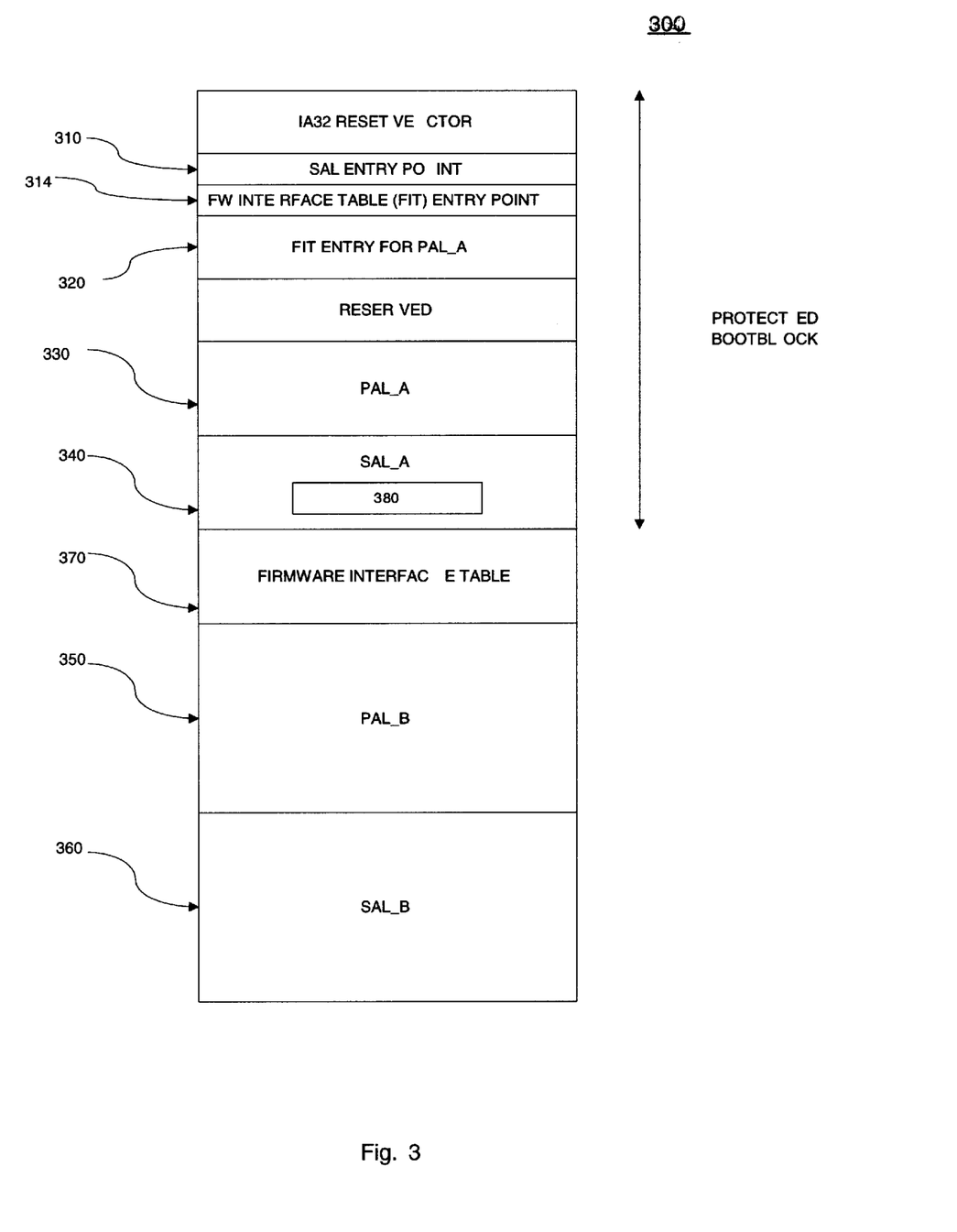
FIG. 3 is a block diagram of the firmware portion of the software stack of FIG. 2, including a bootstrap processor selection routine in accordance with the present invention.

FIG. 3 represents one embodiment of PAL 230 and SAL 240 in a firmware system 300. The disclosed embodiment of firmware system 300 includes pointers 310, 314, 320 to various resources, a firmware interface table (FIT) 370, first and second PAL blocks 330 and 350, respectively, and first and second SAL blocks 340 and 360, respectively. FIT 370 stores starting addresses for the different constituents of firmware system 300. For the disclosed system, entries in FIT 370 point to different firmware components in PAL 350 and SAL 360.

For the disclosed embodiment of firmware system 300, entry points 310, 314, 320, and firmware blocks, PAL_A 330 and SAL_A 340, fall within bootblock 174. As noted above, bootblock 174 is hardware-protected to ensure that a computer system incorporating bootblock 174 can recover from a catastrophic failure that, for example, corrupts unprotected portions of firmware system 300. For one embodiment of the present invention, SAL_A 340 includes a single-threaded BSP-selection routine 380 for writing and reading sticky register 134 of system logic 130. For this embodiment, each processor 110 executes a routine in PAL_A 330 to initialize its resources and then vies for access to sticky register 134 using routine 380 in SAL_A 340. For the disclosed embodiment, entry point 310 provides access to routine 380 from PAL_A 330.

Figure 4:
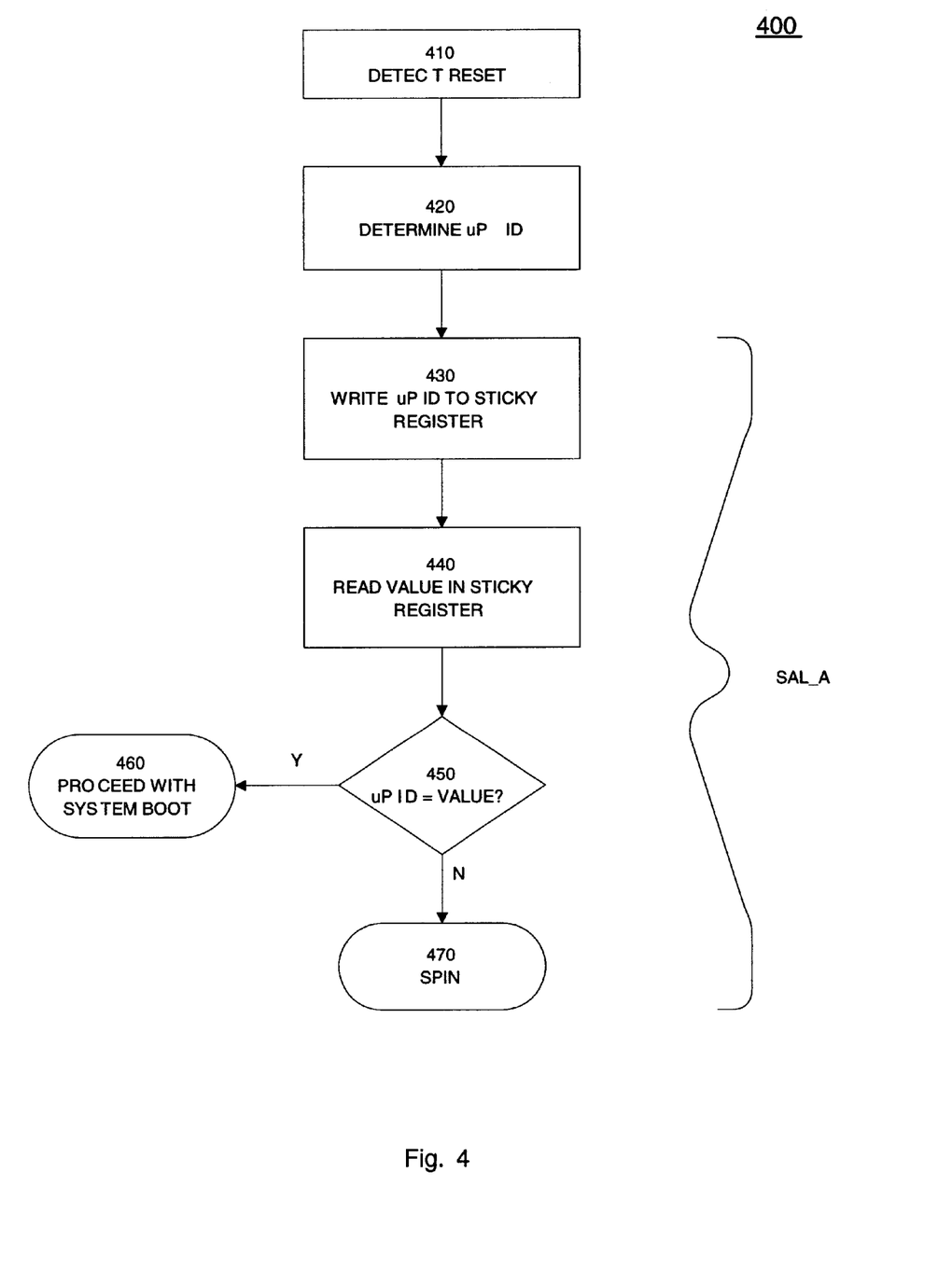
FIG. 4 is a flowchart representing a method in accordance with the present invention for selecting a bootstrap processor.

FIG. 4 represents one embodiment of a method 400 in accordance with the present invention that is implemented by each processor in computer system 100 to select a BSP. Method 400 represents, for example, the operations of a processor executing instructions stored in PAL_A 330 and SAL_A 340.

Method 400 is initiated when a processor detects 410 a reset signal. This may occur, for example, when one or more pins of the processor are driven to a selected voltage state. When reset is detected 410, the processor determines 420 its associated processor ID. This may be done in hardware or through a first firmware (FW) code segment that tests and initializes the processor's resources. For the embodiment of FIG. 3, PAL_A represents the first FW code segment, and it determines a processor ID based on the voltage value driven on certain processor pins.

For one embodiment of the invention, operations performed under control of the first FW code segment correspond to those implemented by built-in-self tests ("BISTs") that are conventionally implemented in micro-code. Unlike micro-coded BIST implementations, where each processor carries its own copy of the test code, a firmware implementation of BIST is shared among the multiple processors of the computer system. For these embodiments, a processor that attempts to access a portion of the code in use by another processor receives a "back-off" signal. The processor may try to access the code segment after a retry interval elapses.

As each processor completes its preliminary test/initialization routine, it proceeds to a BSP-selection routine. For the disclosed embodiment, the BSP selection routine is implemented through a second FW code segment, which provides access to system-level resources. This BSP selection routine includes write and read instructions targeted to sticky register 134. A processor executes the second FW code segment to write 430 its processor ID to sticky register 134, read 440 the value stored in sticky register 134, and compare 450 the read value to its processor ID. Because sticky register 134 is a write once register, a processor executing the second FW code segment reads back its own processor ID only if it is the first processor to write to sticky register 134.

If the read value matches 450 the processor's ID, the processor is the BSP and it proceeds 460 with the system boot. If the read value does not match the processor's ID, it enters 470 a rendezvous state. A processor in the rendezvous state may, for example, execute a loop until it is signaled by the BSP to terminate the loop.

For one embodiment of the invention, the second FW code segment is single threaded so that only one processor at a time may execute it. For firmware system 300, the second FW code segment corresponds to instructions in routine 380 of SAL_A 340.

For standard input/output (I/O) operations, a resource in system logic 130 is accessed through a mechanism called index addressing. For example, sticky register 134 is specified through an address that includes a base value assigned to system logic 130 and an offset value assigned to sticky register 134. A value is written to sticky register 134 by writing its address into a first designated register and writing the value to be written into a second designated register. The designated registers are typically assigned addresses in the I/O address space of the computer system.

For PCI type buses, registers CF8 and CFC are designated to receive the index address and the value to be written, respectively. CFC is locked when CF8 is written, to prevent mixing values (CFC) and targets (CF8) from different transactions. Consequently, a processor initiating a transaction to CFC can block access to CF8 by another processor attempting to complete an earlier transaction, which would defeat the "first-to-write" algorithm for selecting the BSP. In addition, index addressing may mask a faulty processor, by allowing two processors to combine to complete the access.

For one embodiment of the present invention, sticky register 134 is memory mapped to avoid this problem. That is, sticky register 134 is associated with an address in the memory address space of computer system 100. Memory mapping allows a processor to write its processor ID to sticky register 134 using a single store instruction. This eliminates the risk, raised by index-addressing, that different processors may combine to access sticky register 134. It also allows the accesses to be implemented using relatively compact load and store instructions.

For some MP computer systems, it is desirable to implement processor and system bootstrapping in a series of alternating steps. This step-wise approach is useful because processors are unable to fully test their system interfaces without some communication with the system resources. For example, a processor's memory interface should communicate with a portion of memory to fully test its operations. On the other hand, it is risky to fully boot the system-level resources until the processors are fully tested. For these systems, the bootstrapping procedure may implement an "early" processor self test, followed by a preliminary system boot and a "late" processor self test. The early processor self-test may handle test/initialization procedures for processor resources that do not interact directly with the system. The preliminary system boot may initialize some basic system-level resources, such as portions of memory, and the late self-test may handle test/initialization procedures for the processors' interfaces with these system resources. Once the processors are fully tested/initialized, the system-level boot may be completed.

For step-wise bootstrapping procedures, a BSP is selected to handle the preliminary and subsequent system level boot phases. The same BSP may be used for each system-level boot phase. However, if the BSP used in the preliminary system-level boot is found to be functionally deficient during the late processor test/initialization procedure, it is preferable to select another BSP to complete the system level boot. The present invention may be modified to accommodate bootstrapping procedures that implement multiple BSP selections. In particular, the sticky register may be re-enabled to record values written to it (write-record mode) following an initial write, through an operation that does not require resetting the computer system. This allows the sticky register to be re-used for multiple BSP-selection steps during the same bootstrapping process.

Figure 5:
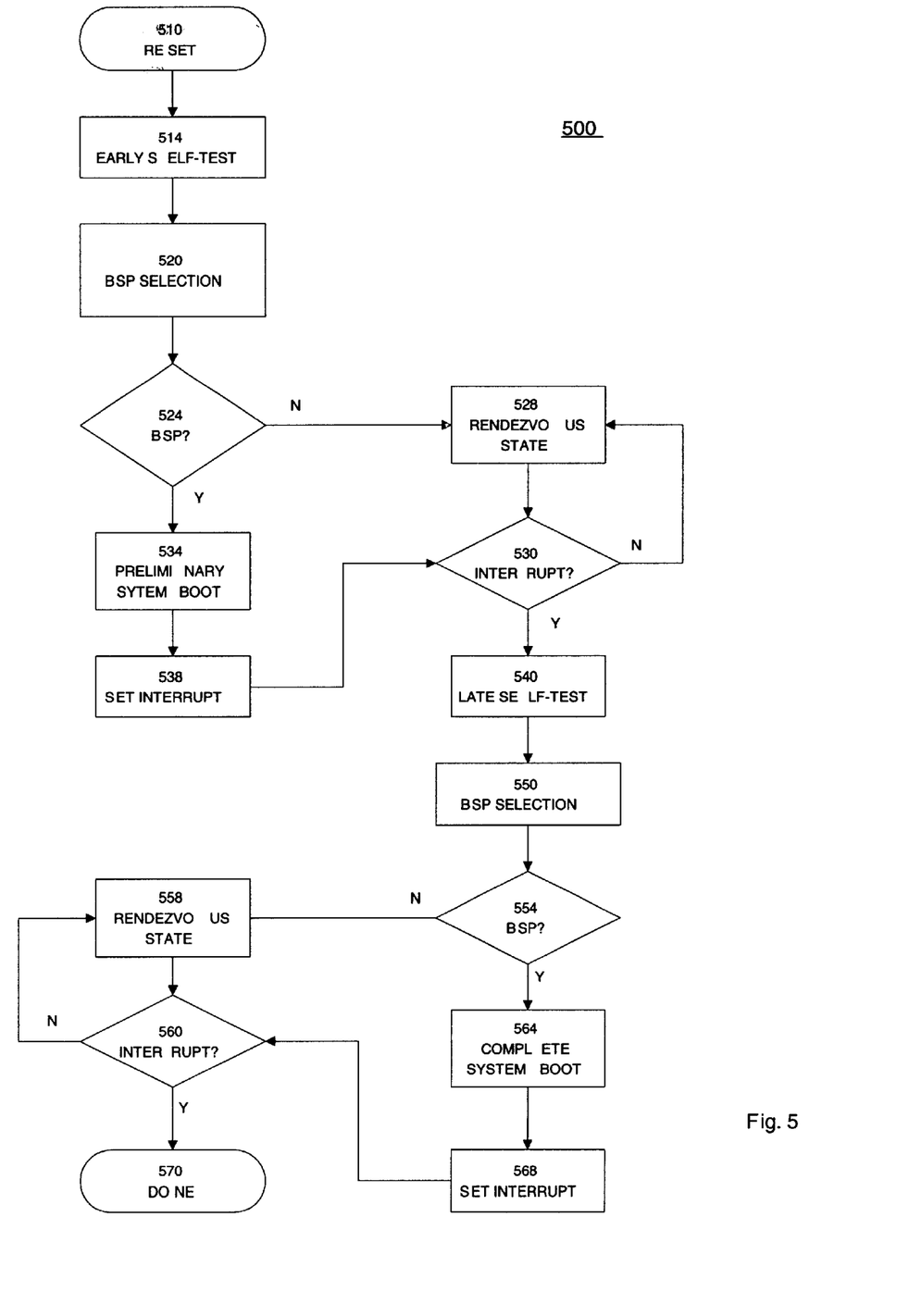
FIG. 5 is a flowchart representing an embodiment of a method in accordance with the present invention for bootstrapping a computer system.

FIG. 5 provides an overview of the bootstrapping process for a computer system that implements the present invention. In particular, FIG. 5 represents one embodiment of a method 500 for bootstrapping a computer system that incorporates multiple BSP selection processes in accordance with the present invention.

Method 500 is initiated when a reset is detected 510. On reset, the processors implement 514 their early self-test routines. As each processor completes its early self-test routine, it executes 520 the BSP selection routine to determine 524 whether it is the BSP. For the disclosed embodiment, the processors vie for access to sticky register 134 through a second FW routine. The processor that wins this race is the processor that reads back its own processor ID from sticky register 134. This processor operates as the BSP. The processors that do not read back their own processor IDs enter 528 a rendezvous state, where they loop 530 until signaled by the BSP.

The processor selected as BSP implements 534 a preliminary system boot. This preliminary system boot includes, for example, initializing a portion of memory 140 and any other system resources that are used by the processors to complete their self-tests. For example, the processors may use a limited amount of memory system 140 to test their caches and system interfaces. The BSP initializes the necessary portion of memory system 140 during the preliminary system boot.

When the BSP completes preliminary system boot 534, it signals the other (non-BSP) processors to execute their late self-test routines. For the disclosed embodiment of method 500, the BSP sets 538 an interrupt, which triggers the processors to execute 540 their late self-tests. Other methods may be employed to "wake-up" non-BSP processors. For example, the non-BSP processors may spin on, e.g. periodically check, a non-sticky bit in a different register of the system logic. The BSP writes a value, e.g. one, to this non-sticky bit when it completes the preliminary boot, and the non-BSP processors exit the rendezvous loop when they read one in the bit. The BSP may implement the late portion of its self-test before or after setting 538 the interrupt. As discussed below in greater detail, the BSP re-enables the sticky bit to a write-record mode before it releases the non-BSP processors from their rendezvous state. Early and late self-tests (blocks 514 and 540) allow each processor to identify any functional limitations it may have. Once the processors are fully tested and initialized, the rest of the computer system is booted. For one embodiment of the invention, this is accomplished by implementing 550 BSP selection and identifying 554 a new BSP processor. Repeating the BSP selection process at this stage, allows the computer system to exclude from the process any processor that has been determined to have functional limitations. The BSP processor that completes 564 the system boot is assured of being fully functional and compatible with the firmware versions stored in the non-volatile memory. This increases the reliability of the computer system.

When a BSP is selected multiple times during bootstrapping, as in method 500, sticky register 134 is modified to record a written value without first resetting the computer system. This may be done by providing sticky register 134 with write-record and write ignore modes. In write-record mode, a write to sticky register 134 updates the values stored in the register. In write-ignore mode, a write to sticky register 134 does not alter the value already present in the register.

For one embodiment of the invention, sticky register 134 includes an additional, non-sticky mode bit that switches sticky register 134 between write-record and write-ignore modes. When the computer system is reset, this additional bit is set to put sticky register 134 in write-record mode. During BSP selection, the processors vie to write their IDs to sticky register 134. For this embodiment, the processor IDs may be augmented by an additional bit value, e.g. 0 or 1, which changes the mode bit of sticky register 134 from write-record to write-ignore. When BSP selection is complete, the BSP may then reset the mode bit, putting sticky register 134 into write-record mode for a subsequent BSP selection. Persons skilled in the art will recognize other mechanisms for switching sticky register 134 between write-record and write-ignore modes without resetting the computer system.

The present invention thus provides a compact and efficient mechanism for selecting a BSP through a combination of firmware and hardware resources. For one embodiment, a memory-mapped, sticky register is provided in the system logic. On reset, processors vie for access to the sticky register through a compact firmware routine. The sticky register records an ID associated with the first processor to successfully access it, and it ignores the processor IDs written to it after to the first successful access. The firmware routine may be implemented as a write operation followed by a read operation to the sticky register. The corresponding store and load operations are readily accommodated in a relatively compact, hardware protected firmware region. Only the first processor to execute the firmware routine reads back its own ID, and this processor operates as the BSP. The sticky register may be switched between a write-record mode and a write-ignore mode by a system reset or it may be switched through a separate mechanism that allows multiple BSP selections to take place between system resets.

We claim:

1. A computer system comprising:
   a system logic device including a write-once register;
   a non-volatile memory in which is stored a bootstrap processor selection routine; and
   a plurality of processors, each processor to attempt to write an associated processor ID to the write-once register, using the bootstrap processor selection routine, in response to a reset signal.

2. The computer system of claim 1, wherein a first of the processors to successfully write its associated processor ID to the write-once register is designated bootstrap processor.

3. The computer system of claim 1, wherein each of the processors executes an early self-test routine prior to vying for access to the write-once register.

4. The computer system of claim 3, wherein the bootstrap processor selection routine includes instructions which when executed by a processor causes the processor to:
   write its associated processor ID to the write-once register;
   read a value from the write-once register; and
   if the read value matches the processor ID, operate as a bootstrap processor (BSP).

5. The computer system of claim 4, wherein the processors execute a late self-test routine when the BSP completes a preliminary bootstrap process.

6. The computer system of claim 5, wherein the BSP switches the write-once register from a write-ignore mode to a write-record mode.

7. The computer system of claim 6, wherein the processors vie for access to the write-once register again responsive to completion of their late self-test routines.

8. The computer system of claim 1, the bootstrap processor selection routine includes write and read operations targeted to the write-once register and a compare operation to determine which of the processors wrote its associated ID to the write-once register first.

9. An article of manufacture comprising:
   a machine readable medium on which are stored instructions executable by a processor to implement a method for selecting a bootstrap processor, the method comprising:
   writing a processor ID to a memory-mapped, write-once register, responsive to a reset event;
   reading a value from the write-once register; and
   implementing a system bootstrap process if the read value matches the processor ID.

10. The machine readable medium of claim 9, wherein the method further comprises initializing processor resources prior to writing the processor ID.

11. The machine readable medium of claim 9, wherein initializing processor resources includes determining the processor ID.

12. The method of claim 9, wherein implementing the system bootstrap process comprises triggering one or more other processes to leave a spin lock state.

13. A method implemented by each processor of a multi-processor system to select a bootstrap processor, the method comprising:
   responsive to a reset event, accessing processor initiation code from a non-volatile memory location;
   on completion of the initiation code, accessing a single threaded code segment in the non-volatile memory to write a processor ID to a write-once register in a chipset of the computer system; and
   executing system initialization code, if a value read from the write-once register matches an ID associated with the processor.

14. A method implemented by each processor of a multiprocessor system, the method comprising:
   executing processor-initialization code from a non-volatile memory in response to a reset signal;
   accessing a single-threaded code segment from the non-volatile memory system to store an associated processor ID to a write-once register;
   comparing a value loaded from the write-once register to the processor ID;
   and
   executing system initialization code if the value matches the processor ID.

15. The method of claim 14, further comprising entering a spin-state if the value does not match the processor ID.

16. The method of claim 15, wherein executing system initialization code comprises:
   resetting the write-once register to a write-record state, responsive to completing a first portion of the initialization code; and
   repeating accessing the write-once register and comparing the loaded value to determine a bootstrap processor for a second portion of the initialization code.

17. The method of claim 16, further comprising initializing an operating system if the value matches the processor ID value and returning to the spin state when the value does not match the processor ID.

18. A computer system comprising:
   a plurality of processors, each processor having an associated processor ID;
   system logic, including a write once register; and
   a non-volatile memory, the non-volatile memory including a bootstrap program, executable by each of the processors responsive to a reset event, to cause the processor to write its associated processor ID to the write-once register, read a value from the write-once register, and proceed with an initialization routine if the read value matches the processor ID value.

19. The computer system of claim 18, wherein the write-once register is accessed through a memory-mapped address.

20. The computer system of claim 19, wherein the bootstrap processor selection program includes a store command to write a processor's ID to the write-once register and a load command to read the value from the write-once register.

21. The computer system of claim 18, wherein the write-once register enters a write-record-mode following a reset event or in response to the processor that executes the initialization routine, and the write-once register enters a write-ignore mode following a first write in write-record mode.

22. The computer system of claim 18, wherein the initialization routine is a preliminary system initialization routine and the processor that proceeds with the initialization routine resets the write-once register to record a new write, responsive to completion of the preliminary system initialization routine.

* * * * *